United States Patent [19]

Bates

[11] 4,386,590
[45] Jun. 7, 1983

[54] MULTI-CYLINDER INTERNAL COMBUSTION ENGINE HAVING SELECTIVE CYLINDER CONTROL

[75] Inventor: Bradford Bates, Ann Arbor, Mich.

[73] Assignee: Ford Motor Company, Dearborn, Mich.

[21] Appl. No.: 695,221

[22] Filed: Jun. 11, 1976

[51] Int. Cl.[3] ............................................. F02D 13/06
[52] U.S. Cl. ............................. 123/198 F; 123/90.16; 123/90.41; 123/90.43
[58] Field of Search ............ 123/198 R, 1 R, DIG. 1, 123/DIG. 7, 90.32, 90.41, 90.43, 198 F; 251/77, 78

[56] References Cited

U.S. PATENT DOCUMENTS

| | | | |
|---|---|---|---|
| 794,683 | 7/1905 | Riotte | 123/198 F |
| 948,248 | 2/1910 | Reaugh | 123/198 F |
| 1,331,787 | 2/1920 | Schalter | 123/198 F |
| 1,350,989 | 8/1920 | Cox | 123/198 F |
| 1,358,459 | 11/1920 | Pache | 123/198 F |
| 1,797,105 | 3/1931 | Shoblom | 123/90.41 X |
| 2,392,933 | 1/1946 | Mallory | 123/198 F |
| 2,528,983 | 11/1950 | Weiss | 123/198 F |
| 2,808,818 | 10/1957 | Sampietro | 123/90.43 |
| 2,853,984 | 9/1958 | Sampietro | 123/90.43 |
| 2,863,430 | 12/1958 | Sampietro | 123/90.43 |
| 3,009,450 | 11/1961 | Ergemann | 123/90.43 |
| 3,147,745 | 9/1964 | Kilgore | 123/90.43 |
| 3,169,515 | 2/1965 | Kilgore et al. | 123/90.43 |
| 3,964,455 | 6/1976 | Brown | 123/90.43 |
| 4,337,738 | 7/1982 | Bobniak et al. | 123/198 F |

FOREIGN PATENT DOCUMENTS 864080 4/1941 France ................. 123/198 F

*Primary Examiner*—Ira S. Lazarus

*Attorney, Agent, or Firm*—John J. Roethel; Daniel M. Stock; Clifford L. Sadler

[57] ABSTRACT

A multi-cylinder internal combustion engine having valve train operated intake and exhaust valves for each cylinder and a valve control system adding the capability of automatic selection as to whether or not given cylinders are to be in operation.

The application of the system to a V-8 engine, for example, to permit selection between four cylinder operation or eight cylinder operation may be summarized as follows:

The cylinders that are to be controlled are identified and movable interposers are installed for both the intake and exhaust valves of the selected cylinders. Control rods interconnect intake interposers to each other and exhaust interposers to each other. A combined actuation arm and interconnection link is provided to transfer motion from a selection actuator to the control rods. A mechanical interlock ensures that exhaust valves are not deactivatable until deactivation of the intake occurs.

More specifically, the control mechanism is operatively associated with the fulcrum of the rocker arm in each of the valve trains controlling the intake and exhaust valves for the selected cylinders. Control of the operation of a given valve is accomplished by moving an interposer into a gap between a fulcrum load transfer tube and a load bearing plate. In this position the interposer prevents movement of the fulcrum and the rocker arm motion is transferred to the valve as in normal operation. With the interposer out of position, the load transfer tube is free to travel, the fulcrum will move up and down on the fulcrum support but the valve will remain stationary.

10 Claims, 5 Drawing Figures

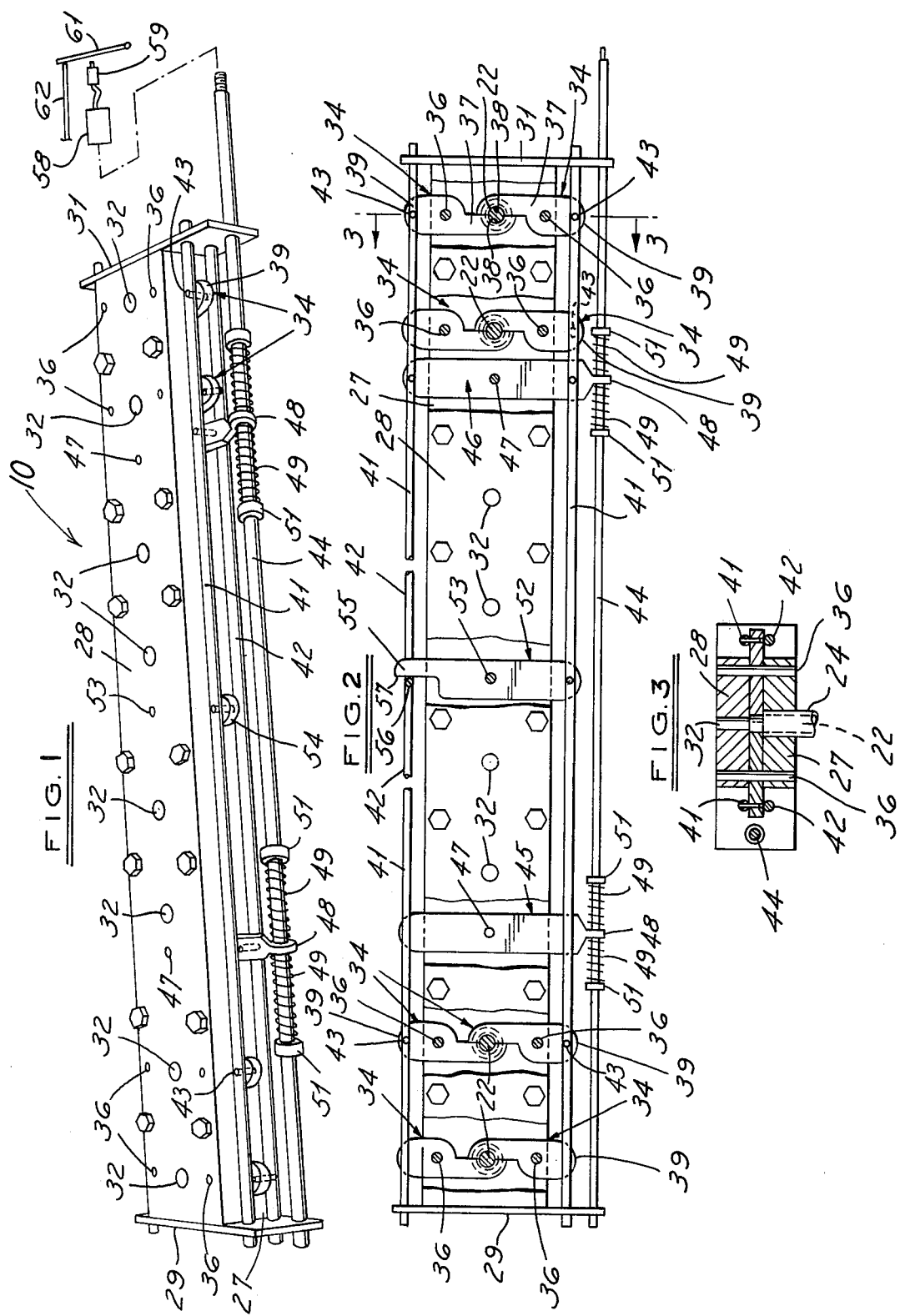

MULTI-CYLINDER INTERNAL COMBUSTION ENGINE HAVING SELECTIVE CYLINDER CONTROL

BACKGROUND OF THE INVENTION

The concept of operating a multi-cylinder internal combustion engine on less than a total number of the cylinders available is not novel. U.S. Pat. No. 2,166,968 issued July 25, 1939 to K. W. Rohlin entitled an "Apparatus for Controlling the Operation of Internal Combustion Engines of the Multi-cylinder Type" is a rather complete thesis on the advantages of being able to operate an engine under certain operating conditions on less than the full number of cylinders available. The patent discloses the use of multiple carburetor jets arranged to deliver fuel charges to each of the cylinders independently of the other. The system includes a controlling means including a device responsive to increased speed for automatically cutting off feed of fuel to one or more of the cylinders. The disclosed system required a complex array of valves and diaphragms for controlling its operation.

During the early days of gasoline rationing in the World War II era it was proposed that fuel consumption could be decreased by permanently deactivating the intake and exhaust valves to one or more of the cylinders of the engine. It was found that the loss of horsepower resulting from the deactivation of one or more of the cylinders was not proportional to the number of cylinders that were involved. That is, if half of the cylinders were deactivated the horsepower output under all conditions of operation was substantially less than 50% resulting in poor acceleration characteristics for the vehicle. Once the change is made to the engine there is no way to switch back and forth between full cylinder and part cylinder operation without tearing down the engine and rebuilding it. A recent version of this technique is disclosed in U.S. Pat. No. 3,874,358 for an engine conversion system issued to H. D. Crower on Apr. 1, 1975.

It is an object of the present invention to provide a mechanism in which the changeover in the number of cylinders in operation automatically occurs while the engine is propelling the vehicle. In its simplest form the changeover from full power to half power and back again occurs in response to throttle position.

SUMMARY OF THE INVENTION

The present invention relates to a multi-cylinder internal combustion engine having intake and exhaust valves for each cylinder. Each intake and exhaust valve is operable by a valve train including a rocker arm pivotable about a fulcrum means mounted on a pedestal. A control mechanism is provided for controlling the operation of selected ones of the cylinders, the control mechanism comprising an interposer means assembly mounted on the engine. The interposer means assembly includes an interposer positioned adjacent the valve train of each intake and exhaust valve of the selected cylinders and shiftable into a valve train disabling position to render the latter inoperative to actuate the valves. Control rods interconnect the intake interposer to each other and the exhaust interposers to each other. The control mechanism is coupled to a selection actuator means. A combined actuation and interconnection link is operative to transfer motion from the selection actuator means to the control to shift the interposer members into and out of valve train enabling or disabling position. A mechanical interlock means coupled to the control rods ensures that the exhaust valves cannot be deactivated until the intake valves are deactivated.

Preferably, the fulcrum means of each valve train comprises a load transfer means and the support means for the movable interposers includes a load bearing plate. Control of the operation of a given valve is accomplished by moving an interposer into a gap between the fulcrum load transfer means and the load bearing plate. This prevents movement of the fulcrum. As the rocker arm rocks or pivots about the fulcrum, its motion is transferred to the given valve to open and close the latter. With the interposer means out of position, the load transfer means is free to travel on the pedestal and the fulcrum is free to move with the rocker arm thereby causing the given valve to remain stationary or in a closed position.

BRIEF DESCRIPTION OF THE DRAWINGS

Further features and advantages of the present invention will be made more apparent as this description proceeds, reference being had to the accompanying drawings, wherein:

FIG. 1 is a perspective view of a control mechanism adapted to be added to a multi-cylinder internal combustion engine for controlling the selective operation of the cylinders;

FIG. 2 is a plan view of FIG. 1 with parts cut away to show the internal components of the control mechanism;

FIG. 3 is a view taken on the line 3—3 of FIG. 2;

DETAILED DESCRIPTION OF THE INVENTION

Many multi-cylinder internal combustion engines in current use are valve-in-head engines having the intake and exhaust valves for the several cylinders mounted in the cylinder head. Mounted on the cylinder head are the rocker arm assemblies forming a part of the valve train or valve gear for operating each valve. Each rocker arm assembly comprises a rocker arm having intermediate its ends pivotal bearing engagement with a fulcrum carried on a pedestal. The rocker arm is engaged at one end by a rocker arm actuator such as a push rod which receives its reciprocatory movement from a follower riding on a cam of a camshaft. At its other end, the rocker arm has operative engagement with a valve or, more specifically, with the valve stem. In the conventional engine the fulcrum provides a fixed pivot axis about which the rocker arm rocks or pivots as it transfers motion from the rocker arm actuator, such as the push rod, to the valve.

If the fulcrum is not held in a fixed position but is permitted to move up as the push rod moves the one end of the rocker arm upwardly and then to drop back down as the one end of the rocker arm follows the push rod down, no effective movement will be transmitted by the rocker arm to the valve stem. Instead the rocker arm will pivot or rock idly about its point of engagement with the valve stem. If this is permitted to occur with both the intake and exhaust valves for a particular cylinder or cylinders, that cylinder or cylinders will be rendered inoperative.

The valve control mechanism embodying the present invention applies the foregoing principle to obtain split-engine operation of a multi-cylinder engine. That is, under predetermined operating conditions a V-8 engine could be operated on four cylinders or a six cylinder engine could be operated on three cylinders. In carrying out the present invention this is accomplished by utilizing a modified rocker arm assembly for each intake and exhaust valve of the cylinders to be selectively rendered operative or inoperative and by mounting a control mechanism in proximity to the modified rocker arm assemblies.

Referring now to FIGS. 1 to 3, inclusive, a control mechanism embodying the present invention is generally designated 10. A modified rocker arm assembly to be used with the control mechanism 10 is shown in FIGS. 4 and 5 and is generally designated 11.

Figure 4:
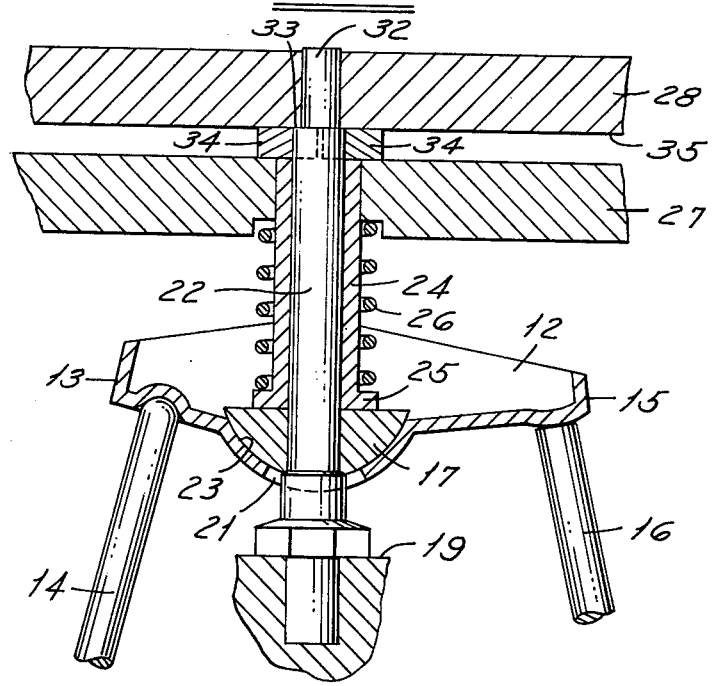
FIG. 4 is an enlarged view of a portion of the valve train for controlling the operation of an intake valve or an exhaust valve and also showing the relationship of the control mechanism embodying the present invention to the valve train.
Figure 5:
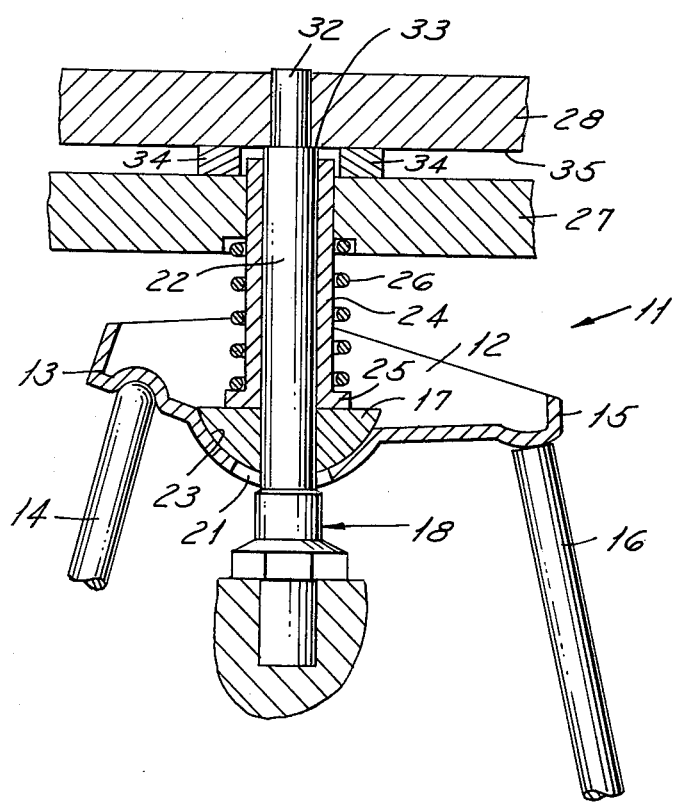
FIG. 5 is a view in part similar to FIG. 4 showing the control mechanism and its relationship to the valve train when the latter is rendered inoperative to actuate a given valve.

The modified rocker arm assembly 11 depicted in FIGS. 4 and 5 comprises a conventional rocker arm 12 adapted to be engaged at one end 13 by a rocker arm actuator shown as the upper end of a push rod 14. At its other end 15, the rocker arm has operative engagement with the end of a valve stem 16. Intermediate its ends the rocker arm 12 has bearing engagement with a fulcrum 17 mounted on a fulcrum supporting means. The fulcrum supporting means comprises an elongated stud 18 somewhat longer than a conventional stud. The longitudinal axis of the stud 18 extends in a generally vertical direction to the engine surface 19 on which it is mounted. As in a conventional engine, the rocker arm 12 is provided with an elongated aperture 21 and the fulcrum 17 is provided with a cylindrical aperture through which the center section 22 of the stud 18 projects. The aperture 21 is elongated lengthwise of the rocker arm 12 to provide the clearance necessary to permit the rocker arm bearing surface 23 to rock around the opposed bearing surface of the fulcrum 17.

In a conventional engine, the fulcrum 17 is held in a down or operative position on the stud center section 22 by a nut or retainer threadedly mounted on the stud. In accordance with the present invention the fulcrum 17 has a load transfer means positioned above it, the superposed load transfer means comprising a tubular member 24 having a flange 25 at its lower end. The tubular member 24 is axially movable on the stud section 22.

As best seen in FIGS. 4 and 5, the tubular member 24 is encompassed by a biasing means in the form of a compression spring 26 reacting between the flange 25 and a lower support plate 27 that is a part of the control mechanism 10.

Referring now to FIGS. 1 to 3, inclusive, the control mechanism 10 comprises the aforementioned lower support plate 27 and an upper or load bearing plate 28. The two plates 27-28 are bolted to each other in parallel spaced relation and have a laterally extending end plates 29 and 31 secured to the plate ends.

It should be noted that the length of the plates 27-28 is such that the control mechanism 10 will span the length of a multi-cylinder engine cylinder head. In the case of the V-8 engine, which has two banks of four cylinders and therefore has two cylinder heads, a separate control mechanism 10 will extend over each bank of cylinders at each side of the engine and the two units will be operated in synchronism.

The plate 28 of the control mechanism 10 is bored to receive an extension 32 of each fulcrum stud 18, the fulcrum studs being longitudinally aligned lengthwise of the cylinder head. When mounted the upper plate 28 rests on the shoulder 33 of the row of studs 18.

(In a prototype installation the control mechanism 10 was fitted into the upper panel of a valve cover which normally conceals the rocker arm assemblies of the engine from view.)

Between the plates 27-28 are positioned fingers or levers, hereinafter frequently referred to as interposers 34. There are two of these interposers 34 for each intake valve and for each exhaust valve of the cylinders of the engine that are to be capable of being deactivated. With reference to FIG. 2, the two sets of interposers 34 shown at the left end of the control mechanism 10 are associated with one of the cylinders at one end of the bank of four cylinders and the two sets of interposers 34 located at the other end are associated with the intake and exhaust valves of the cylinder at the other end of the bank of four cylinders, for example, the front and rear cylinders of either bank in a V-8 engine. There are no interposers 34 associated with the intake and exhaust valves of the intermediate cylinders, a suitable spacer (not shown) being permanently inserted between the upper end of the tubular member 24 and the load bearing plate 28 bottom surface 35. In the alternative, conventional rocker arm assemblies could be used at the cylinders not capable of being deactivated.

As indicated, each interposer 34 is a lever. Each lever is pivoted intermediate its ends on a pivot pin 36. Each lever has at its inner end 37 a recess 38 adapted to semi-encompass the center section 22 of the stud 18 where the center section of the stud projects into the gap between the lower support plate 27 and the upper load bearing plate 28. At its end outwardly of the pivot 36, the interposer has an end portion 39 projecting beyond the side edges of the plates 27-28.

At each side of the support plates 27-28 are spaced parallel upper and lower control rods 41 and 42. Each upper control rod 41 is pivotally coupled at 43 to the projecting and portion 39 of each intake interposer 34. Each lower control rod 42 is similarly pivotally coupled to the projecting end 39 of each exhaust interposer 34.

The control rods 41-42 are slidable in the end plates 29 and 31 at each end of the plates 27-28. The control rods 41-42 are coupled to an actuation control link 44 mounted in the end plates 29-31 parallel to and outboard of the control rods 41-42 at one side of the plates 27-28. The actuation control link 44 is coupled to both sets of control rods 41-42 through coupler levers 45 and 46 which are pivoted intermediate their ends on pivots 47 that extend through the plates 27-28.

The interposer control rods 41 and 42 and the actuation control link 44 comprise an operating means for shifting the interposer means, i.e., the interposers 34, into and out of movement blocking position with respect to the load transfer means, i.e., the tubular members 24.

The coupler lever 45 is pivotally connected to each of the exhaust interposer control rods 42 and the coupler lever 46 is pivotally connected to each of the intake interposer control rods 41. Each coupler lever 45-46 has an end extension 48 through which the actuation control link 44 passes. Separate compression springs 49 extend in opposite directions from the extensions 48 and abut against stops 51 fixed on the control link 44. The springs 49 permit the actuation control link 44 to be shifted in either direction without damage even if the control links 41-42 are blocked against movement for any reason. All that will happen is that the springs 49 will be compressed. When the blocking force is removed, the compressed springs 49 will drive the coupler levers 45-46 in the direction the control link 44 was trying to move them. This then will cause the desired movement of the control links 41-42.

A mechanism for deliberately blocking movement of the control rods 41-42 is provided. This is a control rod interlock operative to block movement of interposers 34 into a position to cause deactivation of the exhaust valves before the intake valves are deactivated. The interlock comprises a lever member 52 pivoted intermediate its ends on a pivot 53. One end 54 is pivotally coupled to one of the control rods 41 at one side of the support plates 27-28 and the other end 55 projects across a control rod 42 on the opposite side of the plates 27-28. This control rod 42 has an upstanding pin 56 abutting an edge 57 of the projection 55, for a purpose that will become apparent.

The actuation control link 44 is shown in FIG. 1 as being coupled to a solenoid 58 connected to a switch 59 operatively related to an accelerator pedal 61 coupled by a cable 62 to a carburetor (not shown). At a predetermined throttle position, the solenoid 58 becomes energized to shift the actuation control link 44 in a direction to ultimately cause deactivation of the intake and exhaust valves of the cylinders capable of being deactivated. It would be understood that additional controls on the actuation of the solenoid 58, a vacuum motor or equivalent or control link movement inducer, can be built into the system as suggested by the prior art. These might include an engine vacuum sensitive control to prevent cylinders being cut-out during vehicle acceleration regardless of throttle position or an engine temperature sensitive device to ensure full power operation until the engine reaches normal operating temperature; or an override switch to present less than full cylinder operation at any time.

Operation of the control mechanism 10 in deactivation of selected cylinders may be summarized as follows:

Under full power conditions, the interposers 34 will be in the positions shown in FIG. 2. That is, each pair of interposers will have their end portions 37 in abutting relation to the stud section 22 and interposed between the load bearing plate 28 and the upper ends of the load transfer tubular members 24, see FIG. 4. When in this condition, the fulcrum 17 is immovable and provides a fixed axis about which the rocker arm 12 rocks to transfer motion from the push rod 14 to the valve stem 16.

If the sensing device or devices signal that the engine could be operated on half the number of cylinders, which signal is translated into energization of the solenoid 58 coupled to the actuation control link 44, the actuation control link 44 will be shifted to the left as viewed in FIG. 2 to swing the couplers levers 45 and 46 in a clockwise direction about their pivots 47.

The coupler lever 46 will cause the upper control rods 41 to move in opposite directions. That is, the control rod 41 adjacent the control link 44 will move to the left and the one on the opposite side of the support plates 27-28 will move to the right. This will cause the interposers 34 associated with the intake valves to move clockwise about their pivots 36 and the end portions 37 to move out of abutting position relative the studs 18 to a position beyond the path of upward movement of the load transfer tubular members 24 (see FIG. 5). The interposers 34 associated with the exhaust valve will be acting in the same manner as the control rods 42 move in synchronism with the adjacent control rods 41.

With the interposers in the position shown in FIG. 5, upward movement of the push rod 14 will cause the rocker arm left end 13 to move upward and actually lift the fulcrum 17 and load transfer tubular member 24 axially of the stud 18 against the resistance of the spring 26. The pivot axis of the rocker arm then in effect is shifted from the fulcrum 17 to the top of the valve stem 16 and the valve remains in a closed condition as the rocker arm rocks about the new pivot axis.

To summarize, when the interposers 34 are moved from the FIG. 4 position to the FIG. 5 position the intake and exhaust valves of the selected cylinders are deactivated. The reverse actuation of the actuation control link 44 then is required to move the interposers 34 back into the gap between the surface 35 of the load bearing plate 28 and the upper end of each load transfer tubular member 24 to reactivate the selected cylinders.

The function of the control lever 52 is to prevent deactivation of the exhaust valves before the intake valves are deactivated. Thus, if the intake control rod 41 coupled to the end 54 of the lever 52 runs into any force blocking its movement to the left as viewed in FIG. 2, the lever 52 will be held against movement in a clockwise direction. Its edge 57 will lie in the path of the pin 56 projecting upwardly from the exhaust control rod 42 lying beneath the end 55 of the lever 52. The exhaust control rod 42 on the one side is tied into the exhaust control rod 42 on the other side of the plates 27-28 by coupler lever 45 so none of the exhaust valve associated interposers 34 can move from the FIG. 4 position to the FIG. 5 position. As soon as the interlock lever 52 swings in a clockwise direction out of the path of pin 56, thus signalling that deactivation of the intake valves is occurring or has occurred, the deactivation of the exhaust valves will occur.

It is to be understood this invention is not limited to the exact construction illustrated and described above, but that various changes and modifications may be made without departing from the spirit and scope of the invention as defined by the following claims:

I claim:

1. A multi-cylinder internal combustion engine having an intake valve and an exhaust valve for each cylinder and a rocker arm assembly for operating each valve, each rocker arm assembly including a rocker arm operatively engageable at one end by a rocker arm actuator and having operative engagement at its other end with a valve, fulcrum means about which each rocker arm is pivotable to transmit actuator motion to the valve, and a fulcrum supporting means positioned intermediate the ends of each rocker arm, each fulcrum supporting means comprising an elongated stud mounted on a surface of the engine and extending generally perpendicular to the mounting surface to project through apertures formed through the rocker arm and fulcrum means, wherein the improvement comprises:

modified rocker arm assemblies for the intake and exhaust valves of selected ones of the cylinders, each modified rocker arm assembly having a load transfer means comprising a tubular member superposed on the fulcrum means and encompassing the stud, the fulcrum means and the superposed load transfer means being slidably supported on the stud of the fulcrum supporting means for movement from and toward the engine surface along the longitudinal axis of the stud, an interposer means comprising independent opposed levers pivotably mounted intermediate their ends coacting with each load transfer means, support plate means mounting each lever on the engine for movement transversely of the stud from a nonblocking position into a position to block movement of the load transfer means and associated fulcrum means away from the engine surface thereby to maintain the fulcrum means in a substantially stationary position to provide a substantially fixed pivot axis about which each rocker arm is pivotable, the opposed levers being swingable in a plane normal to the axis of the stud and having end portions constructed and arranged to semi-encompass the stud upon the end portions being moved toward each other into abutting relation to the stud, the interposer means for each load transfer means when in nonblocking position with respect thereto permitting the latter and its related fulcrum means to reciprocate relative to the engine surface and render the rocker arm inoperative to transmit motion from the actuator to the valve, biasing means urging each load transfer means toward a position in which each interposer means is movable into the blocking position contiguous to the load transfer means, and operating means for shifting the interposer means transversely from the stud into and out of blocking position relative to the related load means, the operating means comprising control rods mechanically interconnecting the intake interposers of the selected cylinders to each other and the exhaust interposers of the selected cylinders to each other, and an actuation control means coupled to the control rods.

2. A multi-cylinder internal combustion engine according to claim 1 in which:

the biasing means comprises:

compression spring means externally encompassing each load transfer means tubular member and reacting against the support plate means to urge the tubular member axially of the fulcrum supporting means stud on which it is mounted out of the plane of movement of the opposed levers.

3. A multi-cylinder internal combustion engine according to claim 2, in which:

a control interlock means blocks movement of opposed levers into exhaust valve load transfer means movement non-blocking position before the movement of opposed levers into intake valve load transfer means non-blocking position occurs.

4. A multi-cylinder internal combustion engine according to claim 2, in which:

a control interlock means blocks movement of opposed levers into exhaust valve load transfer means movement blocking position before the movement of opposed levers into intake valve load transfer means blocking position occurs.

5. A multi-cylinder internal combustion engine according to claim 1, in which:

a control interlock means blocks movement of opposed levers into exhaust valve load transfer means movement blocking position before the movement of opposed levers into intake valve load transfer means blocking position occurs.

6. A rocker arm assembly for operating a valve of an internal combustion engine, the rocker arm assembly including a rocker arm actuator, a rocker arm extending between the actuator and a valve fulcrum means about which the rocker arm is pivotable to transmit actuator motion to the valve, and a fulcrum supporting means including an elongated stud having its longitudinal axis positioned intermediate the ends of the rocker arm, wherein the improvement comprises:

a load transfer means comprising a tubular member superposed on the fulcrum means with both being constructed and arranged for floating movement on the fulcrum supporting means along the longitudinal axis of the stud, an interposer means comprising opposed levers pivotably mounted intermediate their ends on a support plate means mounted on a surface of the engine adjacent the fulcrum supporting means, the interposer means opposed levers being swingable in a plane normal to the axis of the stud and having end portions constructed and arranged to semi-encompass the stud upon being moved toward each other into abutting relation to the stud, the lever end portions when semi-encompassing the stud being effective to block floating movement of the load transfer means and the fulcrum means axially of the stud thereby to provide a substantially fixed fulcrum pivot axis about which the rocker arm is operatively pivotable to transmit motion from the actuator to the valve, the interposer means when in nonblocking position with respect to the load transfer means permitting the latter and thereby the fulcrum means to float on the fulcrum supporting means in response to movement of the rocker arm by the actuator thereby rendering the rocker arm inoperative to transmit motion from the actuator to the valve.

7. A rocker arm assembly according to claim 6 in which:

the operating means for shifting the interposer means into and out of load transfer means movement blocking position comprises:

interposer control rods mounted on the support plate means and coupled to the interposer means levers, and an actuation control link coupled to the interposer control rods to move the latter in synchronized opposite directions of movement to pivot the opposed interposer levers towards each other.

8. A rocker arm assembly according to claim 7 in which:

the biasing means comprises:

compression spring means externally encompassing the load transfer means tubular member and reacting against the support plate means to urge the tubular member axially of the fulcrum supporting means stud away from the support plate means.

9. A rocker arm assembly according to claim 6, in which:

the operating means for shifting the interposer means into and out of load transfer means movement blocking position comprises:

interposer control rods mounted on the support plate means and coupled to the interposer means levers, and an actuation control link coupled to the interposer control rods to move the latter in synchronized opposite directions of movement to pivot the opposed interposer levers toward each other.

10. A rocker arm assembly according to claim 9 in which:
   the biasing means comprises:
   compression spring means externally encompassing the load transfer means tubular member and reacting against the support plate means to urge the tubular member axially of the fulcrum supporting means stud away from the support plate means.

* * * * *